(12) United States Patent
Grijalva et al.

(10) Patent No.: US 8,301,817 B1
(45) Date of Patent: Oct. 30, 2012

(54) RING BUS FOR SHARING RESOURCES AMONG MULTIPLE ENGINES

(75) Inventors: Oscar L. Grijalva, Cypress, CA (US); Chuong HoangMinh Pham, Long Beach, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 285 days.

(21) Appl. No.: 12/902,020

(22) Filed: Oct. 11, 2010

(51) Int. Cl.
*G06F 13/00* (2006.01)
(52) U.S. Cl. .................... 710/112; 709/238
(58) Field of Classification Search .......... 710/100, 710/112, 305; 711/232, 238
See application file for complete search history.

(56) References Cited

U.S. PATENT DOCUMENTS 4,922,486 A * 5/1990 Lidinsky et al. .............. 370/427

* cited by examiner

*Primary Examiner* — Clifford Knoll
(74) *Attorney, Agent, or Firm* — Klein, O'Neill & Singh, LLP

(57) ABSTRACT

An electronic system including modules connected in a ring network is provided. The modules communicate via ring interfaces. The ring interfaces are connected by inter-module links that include a control bus and combined address and data bus. The ring interfaces send and receive single-cycle transactions. The control bus signals the type of transaction and the source and destination modules. The ring interfaces forward transactions to their destinations and may send new transaction when a cycle is empty. Each read operation uses a read request transaction containing an address that is responded to with an acknowledgment transaction that includes the requested data. Each write operation uses two write requests, one containing an address and one containing data. The destination module signals completion of the write operation by sending an acknowledgment transaction.

17 Claims, 4 Drawing Sheets

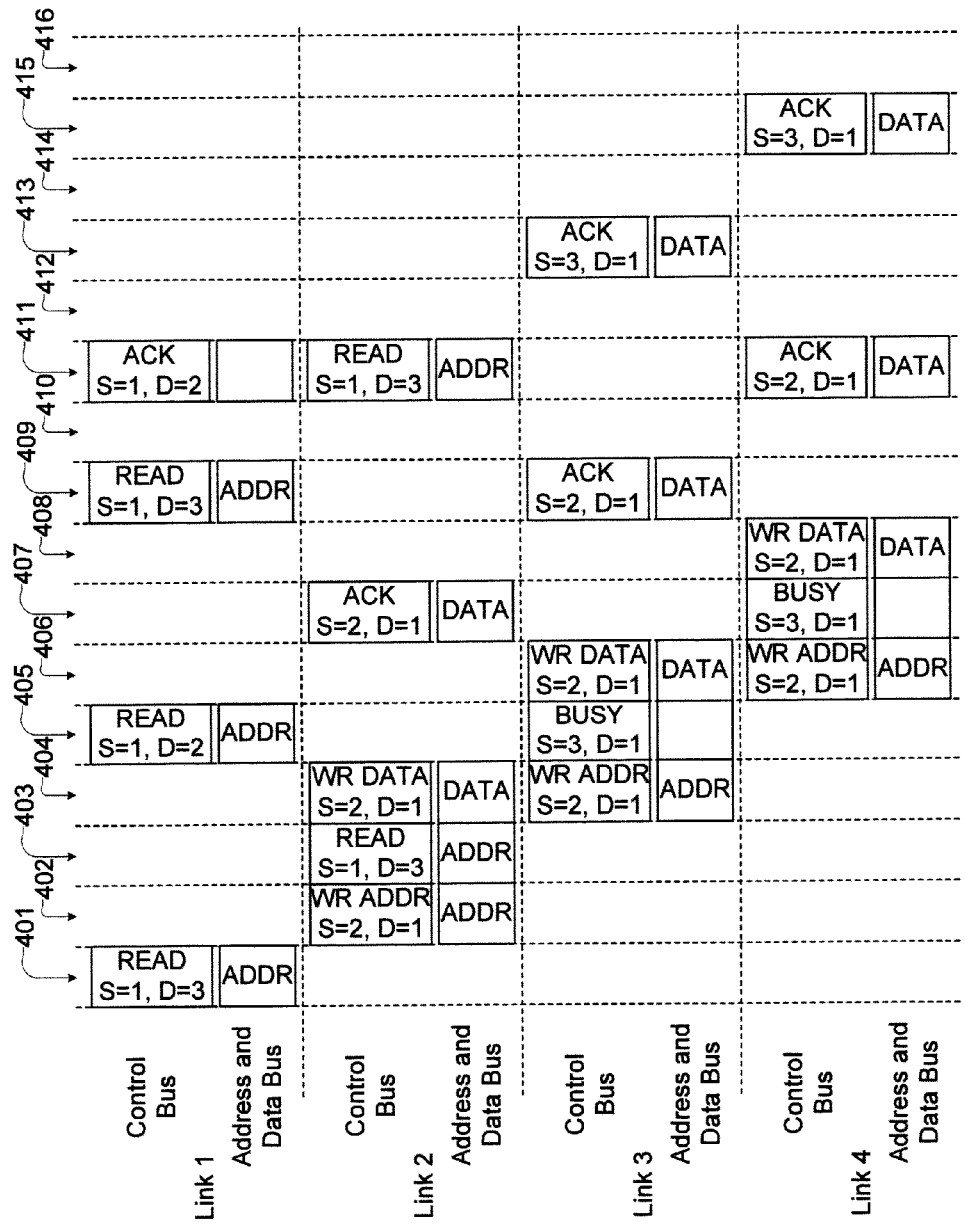

US 8,301,817 B1

RING BUS FOR SHARING RESOURCES AMONG MULTIPLE ENGINES

BACKGROUND

The present disclosure relates generally to communication in electronic circuitry and, more particularly, to a ring network for sharing resources between circuit modules.

Electronic systems increasingly are built using system-on-a-chip integrated circuits where many components of the system are built in one integrated circuit. Typically, the system includes multiple modules. Each module may perform one function in the system or be configured to perform multiple functions. For example, in a networking system, the modules may include protocol engines and encryption engines. The modules frequently include programmable processors, state machines and other components.

Although these modules may perform specific operations, the modules are interconnected so that data and control information may be exchanged. For example, a bus may connect each module to the other modules. Circuitry used to interconnect the modules adds to the overall cost of the system. Additionally, interconnecting the modules may also cause performance losses due to delays in the interconnections. Furthermore, high-speed interconnection between modules may cause timing problems in moving information between modules.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages.

In one embodiment, a system for sharing resources among multiple engines is provided. The system includes a plurality of modules configured to perform operations of the electronic system; a plurality of ring interfaces configured to provide communication between the plurality of modules, each of the ring interfaces coupled to one of the modules; and a plurality of links connecting the ring interfaces in a ring network, each of the links coupled to two of the ring interfaces, each link including a first bus configured to convey control information and a second bus configured to convey address and data values, wherein the ring interfaces communicate by sending and receiving single-cycle transactions, each of the transactions including information signaled on the first bus and values signaled on the second bus.

In one embodiment, a method for communicating between modules of an electronic system is provided where the modules are connected in a ring network by ring interfaces coupled to each of the modules. The method includes sending a single-cycle transaction from one of the modules to another of the modules through the ring interfaces; receiving the transaction at one of the ring interfaces; when the received transaction is a no operation transaction, sending a pending transaction or another no operation transaction from the one of the ring interfaces; when the received transaction includes a source address associated with the one of the ring interfaces, sending a pending transaction or another no operation transaction from the one of the ring interfaces; and when the received transaction includes a destination address not associated with the one of the ring interfaces, forwarding the transaction from the one of the ring interfaces.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE FIGURES

The foregoing features and other features of the present disclosure will now be described with reference to the drawings of the various embodiments. In the drawings, like components have like reference numerals. The illustrated embodiments are intended to illustrate, but not to limit the disclosure. The drawings include the following figures in which:

FIG. 4 is an exemplary timing diagram illustrating operations of an electronic system with a ring network according to one embodiment.

DETAILED DESCRIPTION

Figure 1:
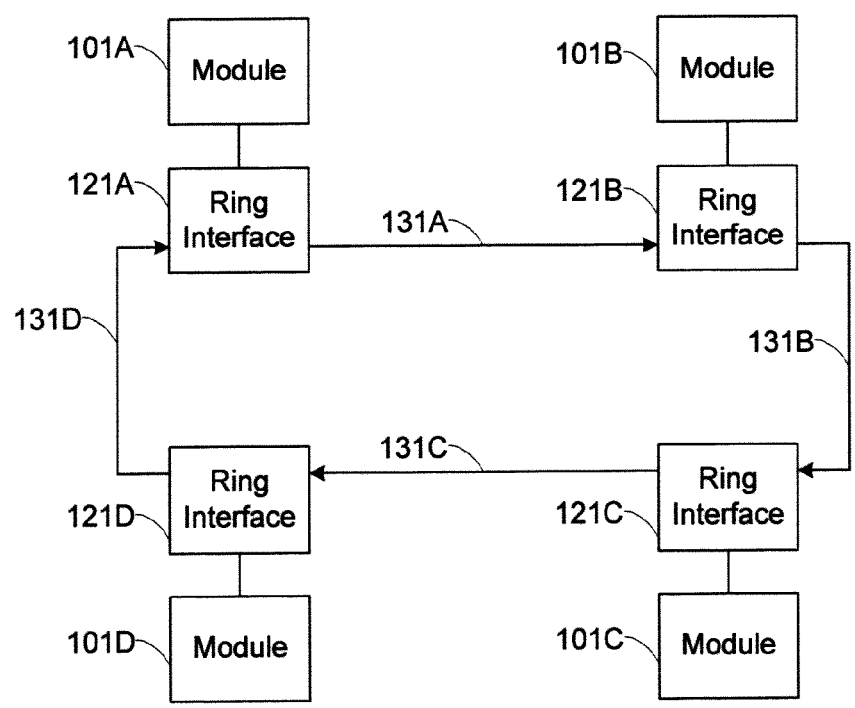
FIG. 1 is a block diagram of an electronic system with a ring network, according to one embodiment.

In one embodiment, an electronic system including modules connected in a ring network is provided. The modules communicate via ring interfaces. The ring interfaces are connected by inter-module links that include a control bus and combined address and data bus. The ring interfaces send and receive single-cycle transactions. The control bus signals the type of transaction and the source and destination modules. The ring interfaces forward transactions to their destinations and may send new transaction when a cycle is empty. Each read operation uses a read request transaction containing an address that is responded to with an acknowledgment transaction that includes the requested data. Each write operation uses two write requests, one containing an address and one containing data. The destination module signals completion of the write operation by sending an acknowledgment transaction.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality" as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or may correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media readable by a computer device, and encoding a computer program of instructions for executing a computer process. The computer program product may also be a propagated signal on a carrier, readable by a computing system, and encoding a computer program of instructions for executing a computer process.

FIG. 1 is a block diagram of an electronic system with a ring network according to aspects of the current disclosure. The electronic system may be an integrated circuit, for example, a system-on-a-chip integrated circuit. The system, in the embodiment of FIG. 1, includes first, second, third, and fourth modules 101A-101D. Other embodiments may include a greater or lesser number of modules. The modules 101 perform operations for the electronic system. For example, the modules 101 may provide processing for various hierarchical layers in a communication system. The modules 101 are connected in a ring network. Each module 101 couples to two inter-module links 131 by a ring interface 121. The inter-module links 131 and the ring interfaces 121 may be referred to as a ring.

A first inter-module link 131A connects from the first module 101A by way of a first ring interface 121A to the second module 101B by way of a second ring interface 121B. A second inter-module link 131B connects from the second module 101B by way of the second ring interface 121B to the third module 101C by way of a third ring interface 121C. A third inter-module link 131C connects from the third module 101C by way of the third ring interface 121C to the fourth module 101D by way of a fourth ring interface 121D. A fourth inter-module link 131D connects from the fourth module 101D by way of the fourth ring interface 121D to the first module 101A by way of the first ring interface 121A.

Each of the inter-module links 131 includes a control bus and an address and data bus. The control bus includes an operation code (op-code), a source identifier, and a destination identifier. The address and data bus is used to transfer addresses and data between modules. In one embodiment, the address and data bus is 32 bits wide. The value of the op-code indicates whether the address and data bus is signaling an address or a data value. In some embodiments, the inter-module links 131 include parity protection. Parity bits or other error detection schemes may be used to check for errors on the address and data bus, the control bus, or both buses, individually or in combination.

The modules 101 communicate by sending transactions over the inter-module links 131. Each transaction includes a paired set of values on the address and data bus and the control bus. Each of the transactions has a duration of one cycle. Transactions are relayed through the ring interfaces 121 until they arrive at their destinations. Accordingly, the one cycle of a transaction occurs at different times depending on the location in the ring. For example, a first transaction may occur during a first cycle on the first inter-module link 131A and occur during a second, later cycle on the second inter-module link 131B while a second transaction occurs concurrently during the second cycle on the first inter-module link 131A. The cycles of the transactions are generally cycles of a clock signal used to time operations of the ring interfaces 121. A ring interface 121 may insert cycles of delay between signals received on an inter-module link 131 and signals sent on another inter-module link 131. Additionally, one or more cycles of delay may be included in the inter-module links 131. Embodiments with high clock rates may generally have more cycles of delay. In other embodiments, the cycles of the transactions are durations of self-timed events. Even in embodiments where the ring interfaces 121 all operate synchronously, the modules 101 may operate with differing clock signals.

The transactions between modules include requests and responses. Response-type transactions are generally sent in response to request-type transactions. A module that sends a request-type transaction may be termed a requester and the target module may be termed a requestee. By way of overview, for a read operation, a requester module sends a read request on the ring. The ring interfaces forward the read transaction until it reaches the requestee module. The requestee module sends, possibly many cycles later, the requested data in response.

For a write operation, a requester module sends an address for the write and in a separate transaction sends data for the write. Since the ring interfaces 121 do not forward transactions that are destined for the local module, those transaction cycles become available for sending other transactions.

The source identifier in the control bus identifies the module that originates the transaction. The destination identifier in the control bus identifies the module that is the target of the transaction. The bit width of the source and destination identifiers is based on the number of modules in the system. For example, 4-bit identifiers may be used in a system with up to 16 modules. The identifiers have a unique value for each of the modules 101. The identifier for each module may also be considered the identifier for the ring interface coupled to that module. The identifiers may be arbitrarily assigned. That is, the order in which modules are connected to the ring does not need to be sequential by identifier. The term ring describes the logical interconnection of modules rather than an ordering of modules or a geometric shape. A module may communicate with another of the modules without concern for the modules' locations in the ring.

The op-code in the control bus signals the type of transaction. In one embodiment, the op-code is a 3-bit code and uses the values and associated operations listed in Table 1. Other embodiments may use a different set of op-codes. The number of types of operations may also differ. For example, in an embodiment without parity, the error response op-code may not be used.

TABLE 1

| Code | Operation |
|------|-----------|
| 000 | No operation |
| 001 | Request: Read |
| 010 | Request: Write Address |
| 011 | Request: Write Data |
| 100 | Response: Acknowledgment |
| 101 | Response: Negative acknowledgment |
| 110 | Response: Busy |
| 111 | Response: Error |

The no operation (or Nop) op-code signals a transaction that does not convey a request or a response. The ring interfaces 121 send the no operation transaction on the inter-module links 131 when they have no other transactions to send. When the ring interfaces 121 receive the no operation transaction, it signals that that cycle is available for use. Values of the destination and source identifiers and the address and data bus for the no operation transaction may be set to any values, for example, all zeros.

The read transaction is a request-type transaction. One of the ring interfaces 121 sends the read transaction when the connected module 101 requests reading from another module. The source and destination identifiers are set to indicate the requester module and the requestee module, respectively. The ring interfaces 121 send the address to be read in the target module on the address and data bus. The value of address to be read indicates a location in the target module, for example, a register, a stack, or a memory location. The requester module generally keeps the read transaction as an active transaction until a response is received from the target module. Some embodiments may also allow the read transaction to time out if sufficient time elapses without receiving a response.

The write-address and write-data transactions are request type transactions. One of the ring interfaces 121 sends the write-address and write-data transactions as a pair when the connected module 101 requests writing to another module. The source and destination identifiers are set to indicate the requester module and the target module, respectively. On the address and data bus, the ring interfaces send the address to be written in the target module during the write-address transaction and data to be written during the write-data transaction. The write-address and the read-address transactions may be separated in time depending on the availability of cycles from the ring interface. In some embodiments, the ring interface 121 may wait until it receives an acknowledgment to the write-address transaction before sending the write-data transaction. The requesting module generally keeps the write transaction as an active transaction until a response is received from the target module to the write-data transaction. Some embodiments may also allow the write transaction to time out if sufficient time elapses without receiving a response.

The acknowledgment (or Ack) transaction is a response type transaction. One of the ring interfaces 121 sends the acknowledgment transaction when the connected module 101 is responding to a request from another module. The source and destination identifiers are set to indicate the responding module and the target module (which is the module that initiated the request being responded to), respectively. The acknowledge transaction indicates success in performing the request that the acknowledge transaction is sent in response to. When the acknowledge transaction is sent in response to a read transaction, the address and data bus conveys the data that was requested to be read. When the acknowledge transaction is sent in response to a write-data transaction, it signals success in performing the requested write operation. When the acknowledge transaction is sent in response to a write-address transaction, it signals the requester module to proceed with the associated write-data transaction. The address and data bus generally conveys no information during the acknowledge transaction for a write and may be set to any value, for example, all zeros.

The negative acknowledgment (or Nak), the "busy", and "error" transactions are response type transactions. Each of the transactions indicates that the request being responded to was not successfully completed. A specific one of the responses may be sent to signal the reason for not successfully completing a request. The negative acknowledgment transaction may signal the responding module was unable to complete the requested transaction before a time limit elapsed; in other words, the transaction timed out. The busy transaction may signal that the responding module is performing other operations and the requester module should retry the request. The error transaction may signal that a parity error was detected. In some embodiments, error transactions are sent in response to an error on the address and data bus but an error on the control bus causes the transaction to be ignored and not forwarded. The source and destination identifiers are set to indicate the responding module and the target module, respectively. The address and data bus generally conveys no information during negative acknowledgment, busy, and error transactions and may be set to any value, for example, all zeros. In some embodiments, the address and data bus may convey a value to provide addition information about why the request was not successfully completed.

A module may generally have only one active, initiated transaction to each of the other modules. Some embodiment may limit the number of active transactions to reduce circuit complexity. For example, a module may be limited to one active, initiated transaction to any module.

Figure 2:
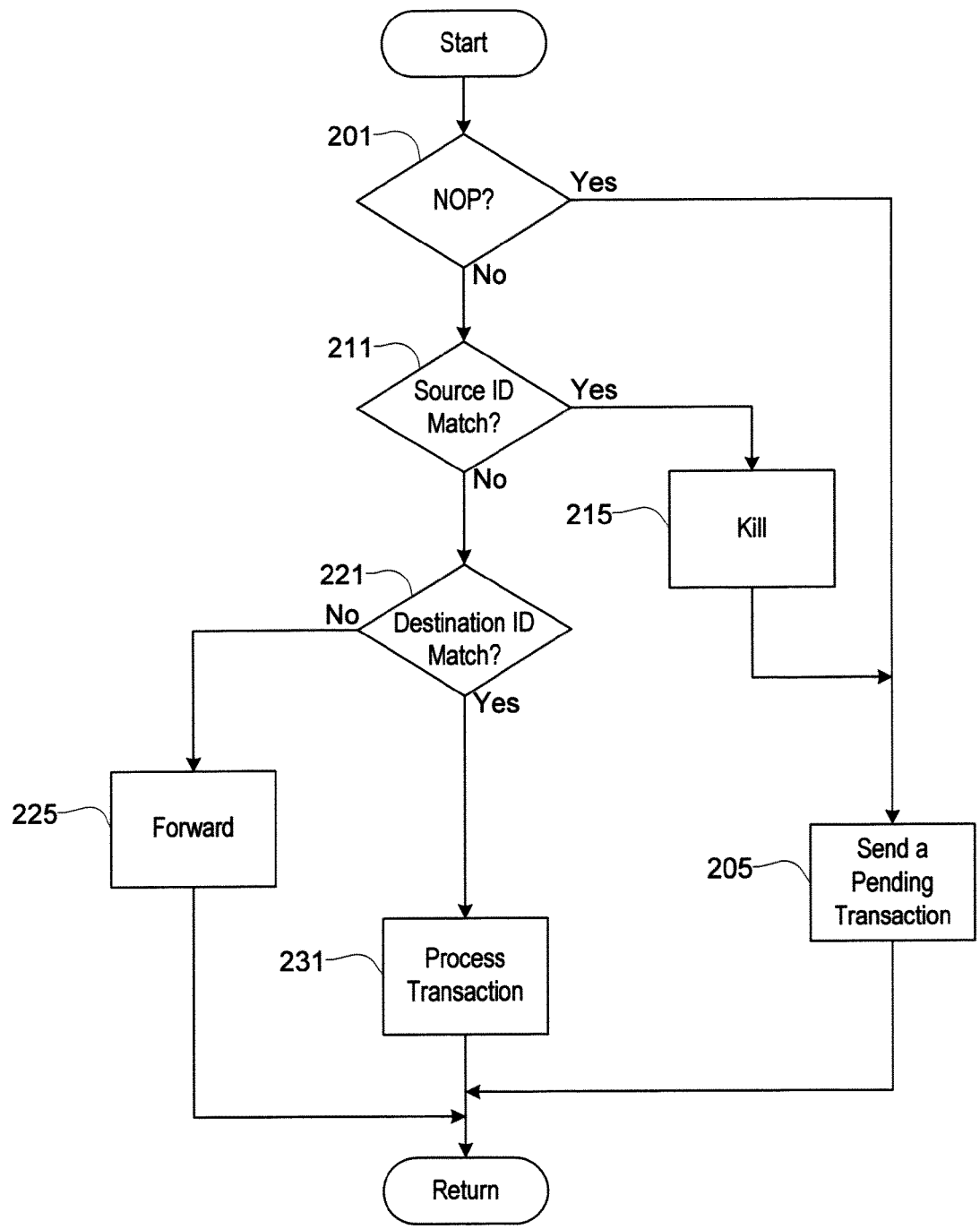
FIG. 2 is a flowchart of a process for inter-module communication, according to one embodiment.

FIG. 2 is a flowchart of a process for inter-module communication according to one embodiment. The process analyzes transactions for a ring network as described with reference to FIG. 1. The process may be implemented using hardware, software, or a combination thereof. For example, the process may be performed by a ring interface as illustrated in FIG. 1. The process is associated with a module that may initiate and receive commands to communicate with other modules.

In block 201, the process tests whether a received transaction is a no-operation transaction. Whether a transaction is a no-operation transaction may be determined from the value of the op-code received in the transaction. If the received transaction is a no-operation transaction, the process continues to block 205; otherwise, the process continues to block 211.

In block 205, the process sends a pending transaction, if one exists. A transaction may be pending when a cycle on the ring has not been available to send a previously generated request or response. Some embodiments may have multiple transactions pending. Which of multiple pending transactions is sent may be based on a prioritization of the pending transactions, for example, based on the type of transaction, module identity, or how long the transaction has been pending. More specifically, an embodiment may prioritize sending responses over sending requests and resending unsuccessful requests over sending new requests.

In block 211, the process tests whether its associated module originated the received transaction. That the associated module originated the received transaction may be determined when the value of the source identifier in the transaction matches the value for the module associated with the process. A matching source identifier may indicate an error at another point in the ring network as the transaction generally should have been handled at another point in the ring rather than have made a full traversal of the ring. If the associated module originated the received transaction, the process continues to block 215; otherwise, the process continues to block 221.

In block 215, the process kills the received transaction. That is, the process does not forward the transaction. Some embodiments may resend the transaction, for example, as may be done in response to a negative acknowledgment. The process continues to block 205.

In block 221, the process tests whether its associated module is the destination of the transaction. That the associated module is the destination of the transaction may be determined when the value of the destination identifier in the transaction matches the value for the module associated with the process. A matching destination identifier indicates that the process should take further action for the transaction. If the module associated with the process is the destination of the transaction, the process continues to block 231; otherwise, the process continues to block 225.

In block 225, the process forwards the received transaction. That is, the process sends the received transaction to the next module in the ring. The process thereafter returns.

In block 231, the process processes the transaction. The process determines the type of transaction and proceeds accordingly. For example, for a read or write request, the process performs the requested operation and sends a response transaction to signal the result of the operation. The process thereafter returns.

Figure 3:
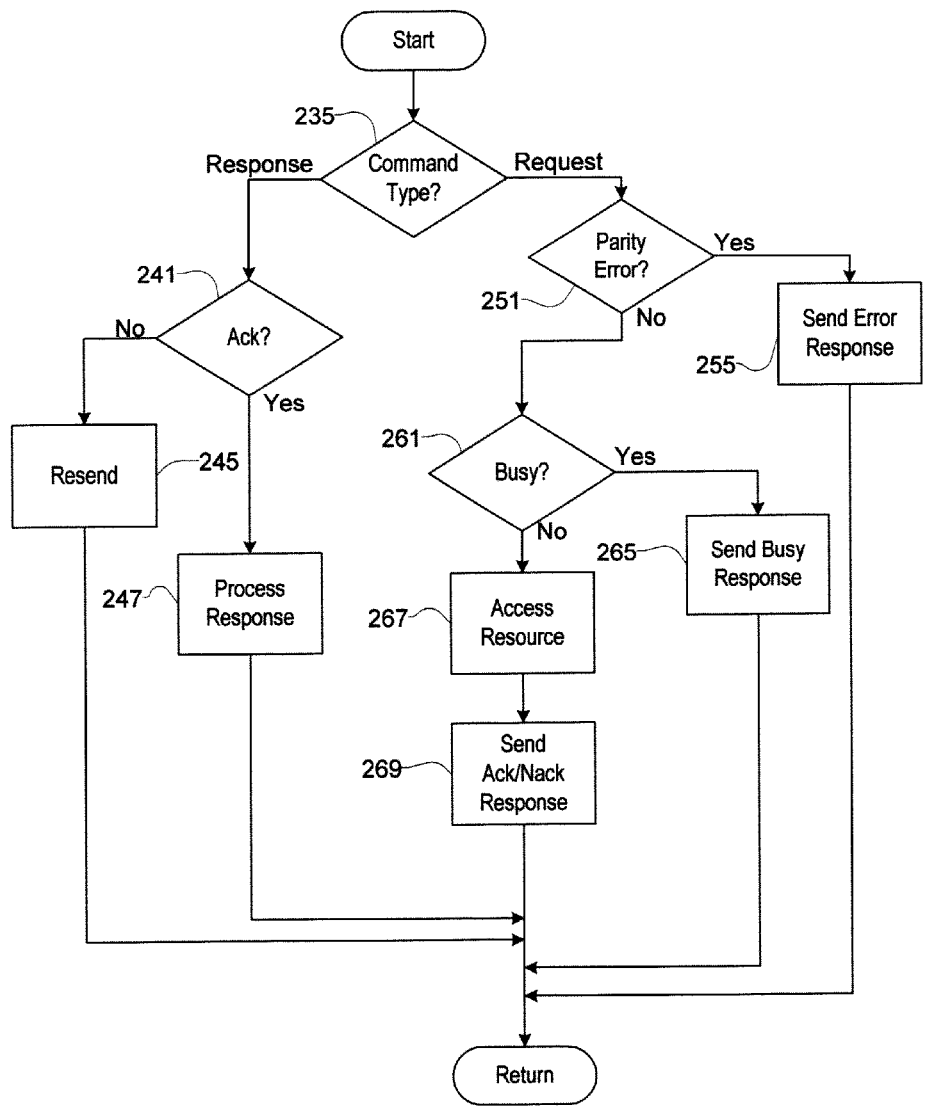
FIG. 3 is a flowchart of a further process for inter-module communication, according to one embodiment.

FIG. 3 is a flowchart of a further process for inter-module communication according to one embodiment. The process processes transactions for a ring network as described with reference to FIG. 1. The process may be implemented using hardware, software, or a combination thereof. The process may be performed when a process as illustrated in FIG. 2 performs its block 231, and the process is associated with a module that may perform read and write operations.

In block 235, the process categorizes the type of transaction. More specifically, the process determines whether the transaction is of a request or a response type. The type of transaction may be determined by the value of the op-code in the transaction. In one embodiment, op-codes signaling read transactions, write address transactions, or write data transactions are transactions of the request type, and op-codes signaling acknowledgment transactions, negative acknowledgment transactions, busy transactions, or error transactions are transactions of the response type. If the type of transaction is a request type transaction, the process continues to block 251; if the type of transaction is a response type transaction, the process continues to block 241.

In block 241, the process determines whether the transaction is an acknowledgment response. Whether the transaction is an acknowledgment response may be determined by the value of the op-code in the transaction. If the transaction is an acknowledgment response, the process continues to block 247; otherwise, the process continues to block 245.

In block 245, the process resends the request transaction that was not responded to with an acknowledgment. Resending the transaction may be modified depending on the specific response received. For example, if the response signaled that the requestee module was busy, the process may wait before resending the request. If the response signaled that a parity error occurred, the process may resend the request without additional delay. If the response signaled a negative acknowledgment, the process may send a modified request in substitution. Thereafter, the process returns.

In block 247, the process handles the received acknowledgment. If the process received the acknowledgment response in response to a write address request, the process may proceed to send a write data request with the data for the write. If the process received the acknowledgment response in response to a write data request, the process may proceed by marking completion of the write, for example, by removing the write from a list of active transactions. If the process received the acknowledgment response in response to a read request, the process may proceed to send the data received with the acknowledgment transaction to the appropriate location in the associated module. Thereafter, the process returns.

In block 251, the process determines whether the request contains an error. An error may be determined based on the presence of a parity error in the received transaction. If the request contains an error, the process continues to block 255; otherwise, the process continues to block 261.

In block 255, the process sends an error response. The error response signals that the requester should retry the request. Thereafter, the process returns.

In block 261, the process determines whether the resource requested is busy. What resource is requested is determined by the address value in the transaction. That the requested resource is busy may be determined, for example, when the resource has another transaction pending or a queue used to access the resource is full. If the resource requested is busy, the process continues to block 265; otherwise, the process continues to block 267.

In block 265, the process sends a busy response. The busy response signals that the requestor should retry the request later. The process thereafter returns.

In block 267, the process accesses the requested resource. Accessing the resource varies with type of resource. For example, for a memory resource, accessing may be a read or write operation. The process continues to block 269.

In block 269, the process sends a response. The sent response signals the result of the access performed in block 267. If the access was not successful, the process sends a negative acknowledgment transaction. If the access was successful, process sends an acknowledgment transaction. For the response to a read request, the process sends the requested data with the acknowledgment transaction.

The description of FIG. 3 is for one embodiment of a process for inter-module communication. Other embodiments may include blocks in addition to those described or may omit some of the described blocks. For example, an embodiment that does not include parity may omit block 251 and block 255.

FIG. 4 is an exemplary timing diagram illustrating operations of an electronic system with a ring network according to one embodiment. The timing diagrams shows values present on inter-module links during sixteen transaction cycles 401-416. For each inter-module link and transaction cycle, FIG. 4 shows values on the control bus and whether addresses or data are on the address and data bus. To ease illustration, cycles with no operation transactions are left blank. FIG. 4 illustrates transactions for an electronic system with four modules as identified in FIG. 1. The illustrated timing is for ring interfaces that have two cycles of delay from input inter-module link to output inter-module link corresponding, for example, to ring interfaces with a register receiving inputs and a register supplying outputs. Three communication operations are illustrated: a read operation by the first module 101A of resources in the third module 101C (which is resent after a busy response), a write operation by the second module 101B to resources in the first module 101A, and a read operation by the first module 101A of resources in the second module 101B.

The read operation by the first module 101A of resources in the second module 101B is now described. This operation proceeds without delays caused by other operations and provides a simple illustration of the timing of transactions. Note that this read operation overlaps in time with the read operation by the first module 101A of resources in the third module 101C. Since the operations do not use the same pairing of modules, the operations are not restricted from concurrent operation.

During cycle 405, for the read operation from the first module 101A of the second module 101B, the first ring interface 121A sends a read request on the first inter-module link 131A. Accordingly, the control bus signals an op-code for a read transaction, a source identifier of 1, and a destination identifier of 2. The address and data bus signals the address in the second module 101B that the first module 101A is requesting be read.

The transaction sent from the first ring interface 121A during cycle 405 is registered in the second ring interface 121B at the beginning of cycle 406. During cycle 406, the second ring interface 121B identifies that the transaction is destined for its local module. In this example transaction, the requested read is completed during cycle 406. That is, data is read from resources of the second module 101B identified by the address sent with the read transaction.

The second ring interface 121B sends an acknowledgment transaction during cycle 407 with the data read during cycle 406. Accordingly, the control bus signals an op-code for an acknowledgment transaction, a source identifier of 2, and a destination identifier of 1. The address and data bus signals the data that was read during cycle 406. In other embodiments, the read operation may entail additional delays with the acknowledgment transaction delayed correspondingly.

The acknowledgment transaction sent from the second ring interface 121B during cycle 407 is registered in the third ring interface 121C at the beginning of cycle 408. During cycle 408, the third ring interface 121C determines that it should forward the transaction through the ring interface. Accordingly, during cycle 409, the third ring interface 121C sends the acknowledgment transaction destined for the first module 101A on the third inter-module link 131C.

The fourth ring interface 121D also forwards the acknowledgment transaction. It registers the acknowledgment transaction at the beginning of cycle 410 and sends the acknowledgment transaction on the fourth inter-module link 131D during cycle 411.

The first ring interface 121A receives the acknowledgment transaction and registers it at the beginning of cycle 412. Since the acknowledgment transaction is destined for the first module 101A, the first ring interface 121A does not forward the transaction. Rather, the first ring interface 121A transfers the data to the first module 101A and ends the read operation begun in cycle 405, for example, by removing a corresponding operation from a list of active operations.

The read operation by the first module 101A of resources in the third module 101C and the write operation by the second module 101B to resources in the first module 101A are now described generally in transaction cycle order. During cycle 401, a read operation from the first module 101A to the third module 101C appears in FIG. 4 with the first ring interface 121A sending a read request on the first inter-module link 131A. Accordingly, the control bus signals an op-code for a read transaction, a source identifier of 1, and a destination identifier of 3. The address and data bus signals the address in the third module 101C that the first module 101A is requesting be read. The transaction sent from the first ring interface 121A during cycle 401 is registered in the second ring interface 121B at the beginning of cycle 402.

During cycle 402, for the write operation from the second module 101B to the first module 101A, the second ring interface 121B sends a write address transaction on the second inter-module link 131B. Accordingly, the control bus signals an op-code for a write address transaction, a source identifier of 2, and a destination identifier of 1. The address and data bus signals the address in the first module 101A that the second module 101B is requesting be written.

Also during cycle 402, the second ring interface 121B analyzes the read transaction sent to it during cycle 401 and determines that it should forward the transaction on around the ring. Accordingly, during cycle 403, the second ring interface 121B sends the read transaction destined for the third module 101C on the second inter-module link 131B. Since the second ring interface 121B is forwarding a received transaction during cycle 403, it does not send a write data transaction that accompanies the write address transaction it sent in during cycle 402.

Also during cycle 403, the third ring interface 121C analyzes the write address transaction sent to it during cycle 402 and determines that transaction should be forwarded through the ring interface. Accordingly, during cycle 404, the third ring interface 121C sends the write address transaction destined for the first module 101A on the third inter-module link 131C.

Also during cycle 404, the second ring interface 121B sends a write data transaction on the second inter-module link 131B as the second part of the write operation begun in cycle 402. Accordingly, the control bus signals an op-code for a write data transaction, a source identifier of 2, and a destination identifier of 1. The address and data bus signals the data that the second module 101B is requesting be written in the first module 101A. The transactions illustrated in FIG. 4 are for an embodiment that does not include acknowledgment responses for write address transactions. Thus, the write data transaction is sent during cycle 404 without waiting for a response to the write address transaction sent in cycle 402.

The third ring interface 121C, during cycle 404 determines that the read transaction received during cycle 403 is destined for its local module. Accordingly, it analyzes the transaction for further processing and does not forward the transaction. In the example illustrated in FIG. 4, the third ring interface 121C determines that the resource requested to be ready is busy and the read request cannot currently be performed. Thus, during cycle 405, the third ring interface 121C responds to the read request by sending a busy transaction on the third inter-module link 131C. Accordingly, the control bus signals an op-code for a busy transaction, a source identifier of 3, and a destination identifier of 1. The address and data bus signals no information and may be set to zeros.

Also during cycle 405, the fourth ring interface 121D registers the write address transaction at the start of the cycle and determines that transaction should be forwarded onward on the ring. Accordingly, during cycle 406, the fourth ring interface 121D sends the write address transaction destined for the first module 101A on the fourth inter-module link 131D.

Similarly, during cycle 405, the third ring interface 121C registers the write data transaction at the start of the cycle and determines that transaction should be forwarded onward on the ring. Accordingly, during cycle 406, the third ring interface 121C sends the write data transaction destined for the first module 101A on the third inter-module link 131C.

During cycle 406, the fourth ring interface 121D registers the busy transaction at the start of the cycle and determines that transaction should be forwarded onward on the ring. Accordingly, during cycle 407, the fourth ring interface 121D sends the busy transaction destined for the first module 101A on the fourth inter-module link 131D.

Also during cycle 407, the first ring interface 121A, registers the write address transaction at the start of the cycle and determines that the transaction is destined for its local module. Accordingly, the first ring interface 121A analyzes the transaction for further processing and does not forward the transaction. The first ring interface 121A saves the address from the transaction for use with the associated write data transaction.

During cycle 407, the fourth ring interface 121D registers the write data transaction at the start of the cycle and determines that the transaction should be forwarded onward on the ring. Accordingly, during cycle 408, the fourth ring interface 121D sends the write data transaction destined for the first module 101A on the fourth inter-module link 131D.

The first ring interface 121A, during cycle 408, registers the busy transaction at the start of the cycle and determines that the received busy transaction is destined for its local module. Accordingly, the first ring interface 121A analyzes the transaction for further processing and does not forward the transaction. Since the busy transaction was sourced from the third module 101C to which the first ring interface 121A had previously sent a read transaction, the first ring interface 121A determines that it should resend the read transaction. In the example illustrated in FIG. 4, the first ring interface 121A resends the read transaction without additional transaction cycles of delay. Accordingly, during cycle 409, the first ring interface 121A sends the same transaction sent during cycle 401. In other embodiments, first ring interface 121A may delay some number of cycles before resending the read transaction.

The first ring interface 121A, during cycle 409, registers the write data transaction at the start of the cycle and determines that the received transaction is destined for its local module. Accordingly, the first ring interface 121A analyzes the transaction for further processing and does not forward the transaction. The first ring interface 121A supplies the address received during cycle 406 and the data received during cycle 408 to the first module 101A for execution of the write operation. In the example illustrated in FIG. 4, the first ring interface 121A sends an acknowledgment transaction with one additional transaction cycle of delay to allow completion of the write by the first module 101A. Accordingly, during cycle 411, the control bus signals an op-code for an acknowledgment transaction, a source identifier of 1, and a destination identifier of 2. The address and data bus signals no information and may be set to zeros. In other embodiments, the write operation may entail additional delays with the acknowledgment transaction delayed correspondingly.

The acknowledgment transaction sent from the first ring interface 121A during cycle 411 is registered in the second ring interface 121B at the beginning of cycle 412. During cycle 412, the second ring interface 121B identifies that the transaction is destined for its local module. Since the acknowledgment transaction is destined for the second module 101B, the second ring interface 121B does not forward the transaction. Rather, the second ring interface 121B ends the write operation, for example, by removing a corresponding operation from a list of active operations or signaling the second module that the write operation completed.

Also during cycle 410, the second ring interface 121B analyzes the read transaction sent to it during cycle 409 and determines that it should forward the transaction on around the ring. Accordingly, during cycle 411, the second ring interface 121B sends the read transaction destined for the third module 101C on the second inter-module link 131B.

The read transaction forwarded by the second ring interface 121B during cycle 411 is registered in the third ring interface 121C at the beginning of cycle 412. During cycle 412, the third ring interface 121C identifies that the transaction is destined for its local module. In this example transaction, the requested read is completed during cycle 412. That is, data is read from resources of the third module identified by the address sent with the read transaction.

The third ring interface 121C sends an acknowledgment transaction during cycle 413 with the data read during cycle 412. Accordingly, the control bus signals an op-code for an acknowledgment transaction, a source identifier of 3, and a destination identifier of 1. The address and data bus signals the data that was read during cycle 412. In other embodiments, the read operation may entail additional delays with the acknowledgment transaction delayed correspondingly.

The fourth ring interface 121D registers the acknowledgment transaction at the start of cycle 414 and during the cycle determines that it should forward the transaction around the ring. Accordingly, during cycle 415, the fourth ring interface 121D sends the acknowledgment transaction destined for the first module 101A on the third inter-module link 131C.

The first ring interface 121A registers the acknowledgment transaction at the beginning of cycle 416 and during the cycle identifies that the transaction is destined for its local module. The first ring interface 121A does not forward the transaction. Rather, the first ring interface 121A transfers the data from the transaction to the first module and ends the read operation resent from the first ring interface 121A during cycle 409, for example, by removing a corresponding operation from a list of active operations.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A electronic system, comprising:
    a plurality of modules configured to perform operations of the electronic system;
    a plurality of ring interfaces configured to provide communication between the plurality of modules, each of the ring interfaces coupled to one of the modules; and
    a plurality of links connecting the ring interfaces in a ring network, each of the links coupled to two of the ring interfaces, each link including a first bus configured to convey control information and a second bus configured to convey address and data values,
    wherein the ring interfaces communicate by sending and receiving single-cycle transactions, each of the transactions including information signaled on the first bus and values signaled on the second bus.

2. The electronic system of claim 1, wherein the control information comprises a source identifier indicating the one of the modules that generated a transaction, a destination identifier indicating the one of the modules that is the target of the transaction, and an op-code indicating a type of the transaction.

3. The electronic system of claim 2, wherein the second bus of each of the links signals an address value during some transactions and a data value during other transactions based on the transaction type.

4. The electronic system of claim 3, wherein the transaction types comprise:
   read requests for one of the modules to request a read from another of the modules from a location indicated by an address value signaled on the second bus;
   write data requests for one of the modules to request a write to another of the modules of a data value signaled on the second bus;
   write address requests for one of the modules to supply an address value signaled on the second bus to indicate a location requested to be written in another of the modules in an associated write data request;
   acknowledgment responses for signaling successful completion of a requested read or a requested write; and
   no operation transactions for signaling transaction cycles not associated with reading or writing between the modules.

5. The electronic system of claim 4, wherein transactions having an acknowledgment responses type sent to signal successful completion of a requested read include the requested data value signaled on the second bus.

6. The electronic system of claim 4, wherein the transaction types further comprise negative acknowledgment responses for signaling that a requested read or a requested write was not successful.

7. The electronic system of claim 4, wherein the transaction types further comprise busy responses for signaling that the module requested to perform a read or a write did not perform the request because the module was busy.

8. The electronic system of claim 4, wherein the transaction types further comprise error responses for signaling that the module requested to perform a read or a write did not perform the request because the module detected a communication error, and
   wherein the links include parity signals for use in detecting the communication error.

9. The electronic system of claim 3, wherein the ring interfaces are configured to forward transactions received when the destination identifier in the transaction does not match a value associated with the module coupled to the ring interface.

10. The electronic system of claim 9, wherein the ring interfaces are further configured to send a new transaction when not forwarding a transaction.

11. A method for communicating between modules of an electronic system, the modules connected in a ring network by ring interfaces coupled to each of the modules, the method comprising:
    sending a single-cycle transaction from one of the modules to another of the modules through the ring interfaces;
    receiving the transaction at one of the ring interfaces;
    when the received transaction is a no operation transaction, sending a pending transaction or another no operation transaction from the one of the ring interfaces;
    when the received transaction includes a source address associated with the one of the ring interfaces, sending a pending transaction or another no operation transaction from the one of the ring interfaces; and
    when the received transaction includes a destination address not associated with the one of the ring interfaces, forwarding the transaction from the one of the ring interfaces.

12. The method of claim 11, further comprising:
    performing a write operation from a first module of the modules to a second module of the modules, the write operation comprising:
    sending a write address request transaction from the ring interface coupled to the first module, the write address request transaction including an address value identifying a location in the second module;
    sending a write data request transaction from the ring interface coupled to the first module, the write data request transaction including a data value to be written to the identified location in the second module;
    receiving the write address request transaction at the ring interface coupled to the second one of the modules;
    receiving the write data request transaction at the ring interface coupled to the second one of the modules;
    writing the data value to location in the second module identified by the address value; and
    sending an acknowledgment response transaction from the ring interface coupled to the second one of the modules.

13. The method of claim 12, further comprising performing a read operation from a first module of the modules of a second module of the modules, the read operation comprising:
    sending a read request transaction from the ring interface coupled to the first one of the modules, the read request transaction including an address value identifying a location in the second module;
    receiving the read request transaction at the ring interface coupled to the second one of the modules;
    reading a data value in the second module from location identified by the address value; and
    sending an acknowledgment response transaction from the ring interface coupled to the second module, the acknowledgment response transaction including the data value.

14. The method of claim 13, wherein the address values and the data values are transmitted on common connections between the ring interfaces.

15. The method of claim 11, further comprising performing a write operation from a first module of the modules to a second module of the modules, the write operation comprising:
    sending a write address request transaction from the ring interface coupled to the first module, the write address request transaction including an address value identifying a location in the second module;
    sending a write data request transaction from the ring interface coupled to the first module, the write data request transaction including a data value to be written to the identified location in the second module;
    receiving the write address request transaction at the ring interface coupled to the second one of the modules;
    receiving the write data request transaction at the ring interface coupled to the second module;
    when the second module is busy, sending a busy response transaction from the ring interface coupled to the second module; and
    when the second module is not busy, writing the data value to location in the second module identified by the address value, and sending an acknowledgment response transaction from the ring interface coupled to the second module.

16. The method of claim 15, further comprising performing a read operation from a first module of the modules of a second module of the modules, the read operation comprising:

sending a read request transaction from the ring interface coupled to the first one of the modules, the read request transaction including an address value identifying a location in the second module;

receiving the read request transaction at the ring interface coupled to the second one of the modules;

when the second module is busy, sending a busy response transaction from the ring interface coupled to the second module; and when the second module is not busy, reading a data value in the second module from location identified by the address value, and sending an acknowledgment response transaction from the ring interface coupled to the second module, the acknowledgment response transaction including the data value.

17. The method of claim 11, further comprising:

checking the received transaction for an error; and when an error is detected in the received transaction, sending an error response transaction.

* * * * *